United States Patent [19]

Sakumoto

[11] Patent Number: 4,813,626
[45] Date of Patent: Mar. 21, 1989

[54] DRAG CONTROL DEVICE IN SPINNING TYPE FISHING REEL

[75] Inventor: Akinori Sakumoto, Fuchu, Japan

[73] Assignee: Ryobi Limited, Hiroshima, Japan

[21] Appl. No.: 114,429

[22] Filed: Oct. 29, 1987

[30] Foreign Application Priority Data

Nov. 17, 1986 [JP] Japan .................. 61-176996[U]

[51] Int. Cl.$^4$ .............................................. A01K 89/02
[52] U.S. Cl. ............................................. 242/84.5 A
[58] Field of Search ................ 242/84.5 R, 84.5 A, 242/84.5 P, 84.51 R, 84.51 A, 84.53; 188/82.7, 82.77, 71.5

[56] References Cited

U.S. PATENT DOCUMENTS

| 2,080,900 | 5/1937 | Shakespeare | 242/84.5 R |
| 2,098,404 | 11/1937 | Shakespeare | 242/84.5 R |
| 4,193,561 | 3/1980 | Stiner | 242/84.51 A |
| 4,196,870 | 4/1980 | Puryear | 242/84.51 A |
| 4,513,925 | 4/1985 | Yamaguchi | 242/84.5 A |
| 4,591,108 | 5/1986 | Ban | 242/84.5 R |

FOREIGN PATENT DOCUMENTS 57-42310 9/1982 Japan .
60-11797 4/1985 Japan .
60-160155 10/1985 Japan .

Primary Examiner—Joseph J. Hail, III
Attorney, Agent, or Firm—Parkhurst, Oliff & Berridge

[57] ABSTRACT

Disclosed is a drag control device in a spinning type fishing reel which includes a reel body and a spool shaft extending through the reel body. The drag control device comprises a hollow cylindrical member, a drag control screw, a click spring member and a stop member. The hollow cylindrical member extends from a rear portion of the reel body and is disposed over the spool shaft. The drag control screw has one end portion threadingly engaged with the hollow cylindrical member, an intermediate portion formed with the stepped portion, and the other end portion formed with indentations at an outer peripheral surface thereof. The hollow cylindrical member is formed with a groove at its outer peripheral surface and a through hole extending in radial direction thereof. The click spring member is fitted with the groove and engageable with the indentations. The stop member is provided to the click spring member and extends through the through-hole into the stepped portion.

9 Claims, 3 Drawing Sheets

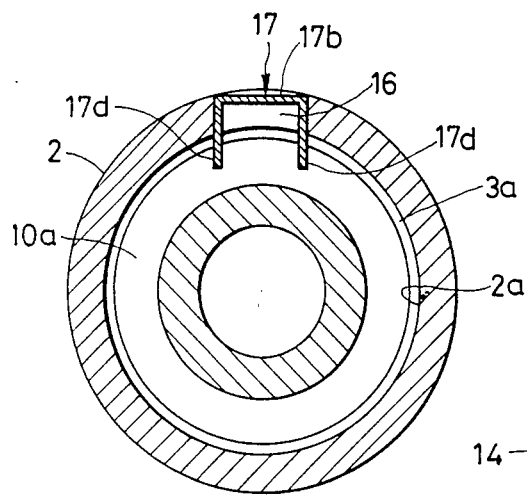
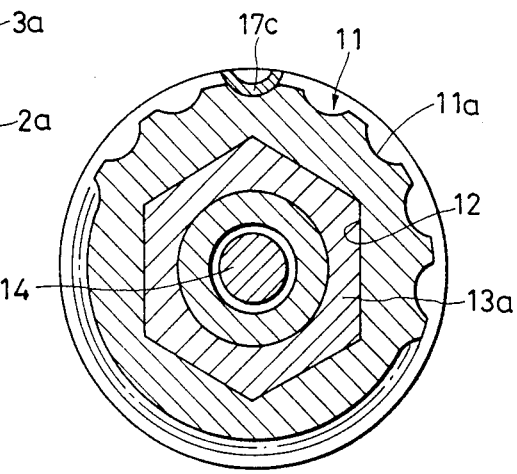
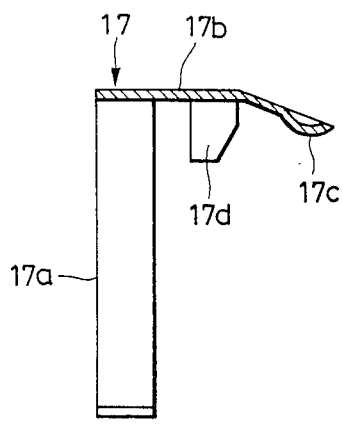
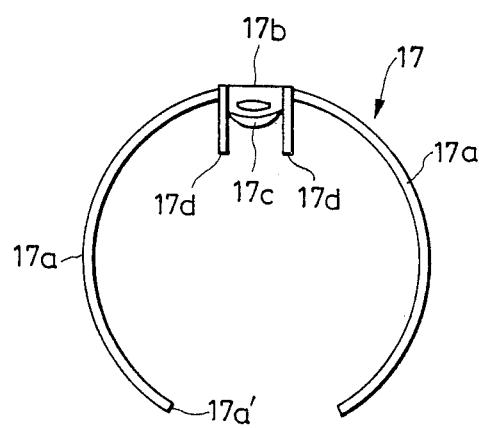

DRAG CONTROL DEVICE IN SPINNING TYPE FISHING REEL

BACKGROUND OF THE INVENTION

The present invention relates to a drag control device in a spinning type fishing reel.

According to a conventional type drag control device in a spinning reel, a sleeve member protrudes from a rear portion of a reel body, and drag washers mounted over a spool shaft are assembled in the sleeve member. A drag control screw is threadingly engaged with the sleeve member, and a planar end of the drag control screw is brought into pressing contact with the drag washers. By the rotation of the drag control screw about its axis, the drag control screw is displaceable in an axial direction thereof because of threading enagement with the sleeve member, so that the drag washers are fully frictional to restrict rotation of a spool.

With the conventional structure, the drag control screw may be released or separated from the reel body due to its excessive rotation, or during fishing, the control screw may also be released due to free rotation thereof. Further, it would be rather difficult to provide optimum drag force in accordance with kinds of fishing lines, targetting fishes, and fishing rods, and furthermore, it would be also difficult to maintain drag force at a constant level.

Japanese Utility Model Publication No. 60-11797 shown in FIG. 1 discloses a drag control device in which a cylindrical drag control knob 100 engaged with a drag control screw (not shown) is disposed over a cylindrical member 101 integral with a reel body (not shown), and inner peripheral surface of the cylindrical member 101 is in threading engagement with an outer peripheral surface of the drag control screw which urges a drag washer 102 disposed over a spool shaft 103. The drag control knob 100 has an inner peripheral surface from which a projection 104 protrudes radially inwardly. Further, the sleeve member 101 has an outer peripheral surface provided with a projection 105 protruding radially outwardly. Upon rotation of the knob 100, the projection 104 is brought into abutment with the projection 105, so that over rotation of the knob 100 can be prevented, to thus obviate dropping of the knob 100 and drag control screw from the reel body.

According to this type of structure, drag control is only performed within a single rotation of the drag control knob 100. Further, the knob 100 may be rotated or angularly displaced freely upon shocking, etc.

Japanese Utility Model Publication No. 57-42310 discloses a mechanism for preventing a drag control knob from relaxation relative to a reel body. As shown in FIG. 2, in this publication, a drag knob 200 is threadingly engaged with a thread portion of a spool shaft (not shown), and the knob 200 is provided with a sleeve portion whose inner peripheral surface is formed with irregularities 201. A resilient latch member 203 extends from washers (not shown). The latch member 203 is engagable with the irregularities 201, so that excessive rotation of the knob 200 is prevented. That is, upon manual rotation of the knob 200, the latch member 203 resiliently rides over the irregularities 201. Upon termination of the rotation of the knob, the latch member 203 is in engagement with one of the recesses of the irregularities 201.

With this structure, over rotation of the knob 200 can be obviated. However, the knob may be separated from the reel body due to forcible manual rotation thereof.

Japanese utility Model Application Publication (kokai) No. 60-160155 discloses a drag mechanism in which surface irregularities 300 are formed at an outer peripheral surface of a drag control screw 301 as shown in FIG. 3. A cylindrical sleeve 302 extending from a reel body (not shown) is disposed over the drag control screw 301, and a click spring member 303 is fixedly secured to the sleeve 302. The click spring member 303 is selectively engageable with one of the recessed portions of the surface irregularities 300. With the structure, free rotation of the drag control screw can be prevented.

Further U.S. Pat. No. 4,193,561 discloses a clicker device for fishing reel, and U.S. Pat. No. 4,196,870 discloses a drag click device for fishing reel, whose technical field would be similar to that of the present invention.

SUMMARY OF THE INVENTION

It is therefore, an object of the present invention to overcome the above-described drawbacks and disadvantages, and to provide an improved drag control device in a spinning type fishing reel.

Another object of the present invention is to provide such device capable of preventing a drag control screw from being dropped or separated from a reel body.

Still another object of this invention is to provide such device in which free rotation or relaxation of the drag control screw is avoidable by the provision of click mechanism.

Still another object of this invention is to provide an improved drag control device which provides audiable clicking sound for acknowledgement of drag control by an operator.

Still another object of this invention is to provide such device having simple construction and easily assembleable and disassembleable without using any tools.

These and other objects of the present invention will be attained by providing an improved click spring member and a stop member. That is, according to the drag control device of the present invention in a spinning reel which includes a reel body and a spool shaft extending through the reel body, provided are a hollow cylindrical member, a drag control screw, the click spring member and the stop member. The hollow cylindrical member extends from a rear portion of the reel body and is disposed over the spool shaft. The hollow cylindrical member is formed with a groove at its outer peripheral surface and a through-hole extending in radial direction thereof. The drag control screw has one end portion, an intermediate portion and another end portion. The one end portion is threadingly engaged with the hollow cylindrical member, the intermediate portion is formed with a stepped portion, and the other end portion is formed with indentations at an outer peripheral surface thereof. The click spring member is fitted with the groove of the cylindrical member and is engageable with the indentations. The stop member is provided to the click spring member and extends through the through-hole into the stepped portion.

Since the click spring member provided with the stop member is fixed to the hollow cylindrical member (stationary side), and the stop member is engageable with the drag control screw (movable side), the abutment between the stepped portion and the stop member prevents the drag control screw from dropping or separation from the reel body. Further, since the click spring member is also engageable with the indentations, an audible clicking sound is generated upon rotation of the drag control screw, so that an operator can acknowledge drag control. The engagement between the click spring member and the indentations also prevents the drag control screw from free rotation or relaxation, so that constant drag force is obtainable.

BRIEF DESCRIPTION OF THE DRAWINGS

In the drawings,

FIG. 5($b$) is a cross-sectional view showing the sleeve portion of FIG. 5($a$);

FIG. 6 is a cross-sectional view taken along the line VI—VI of FIG. 4;

FIG. 7 is a cross-sectional view taken along the line VII—VII of FIG. 4

FIG. 8($a$) is a side view of a click spring member used in the drag control device according to the present invention; and FIG. 8($b$) is a front view of the click spring member shown in FIG. 8(a).

DETAILED DESCRIPTION OF THE INVENTION

Figure 1:
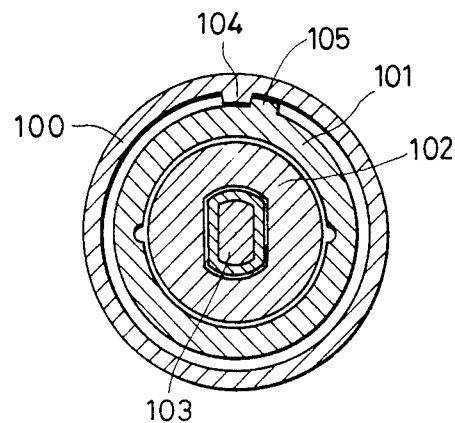
FIG. 1 is a cross-sectional view showing a conventional drag control device in a spinning reel.
Figure 2:
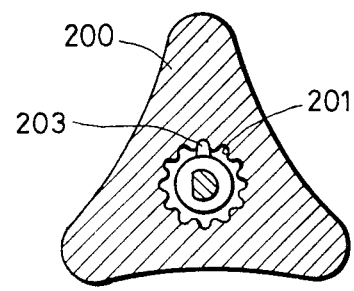
FIG. 2 is a cross-sectional view showing a drag control device according to another conventional spinning reel.
Figure 3:
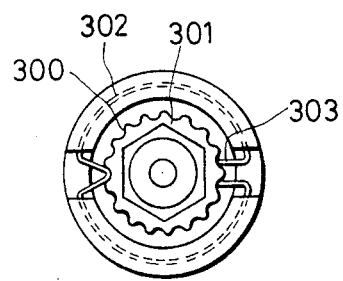
FIG. 3 is a cross-sectional view showing a drag control device according to still another conventional spinning reel.
Figure 4:
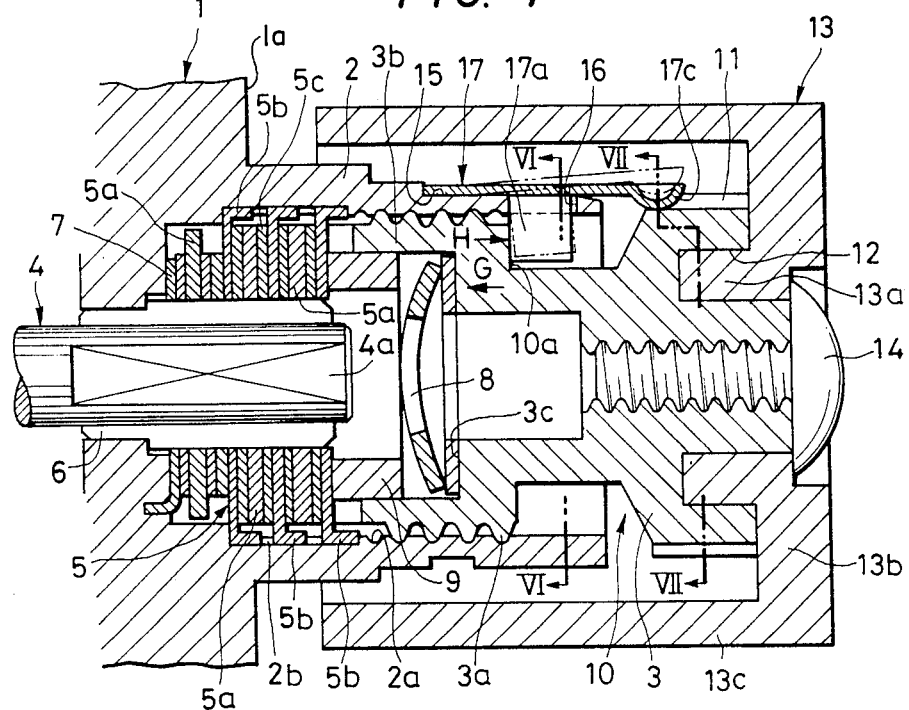
FIG. 4 is a cross-sectional view showing a drag control device in a spinning type fishing reel according to the present invention.

One embodiment according to the present invention will be described with reference to FIGS. 4 thru 8($b$). As best shown in FIG. 4, a reel body 1 has a rear face 1a from which a cylindrical member 2 extends. The cylindrical member 2 is provided integral with the reel body 1. In an inner peripheral surface of the cylindrical member 2, a female thread 2a is formed. A drag control screw 3 is provided coaxial with the cylindrical member 2. A base portion of the cylindrical member 2 is formed with grooves 2b at its inner peripheral surface. The drag control screw 3 has a sleeve portion 3b at one end portion thereof whose outer peripheral surface is formed with a male thread 3a which is in threading engagement with the female thread 2a of the cylindrical member 2. The other end portion of the drag control screw 3 is engaged with a drag control knob 13. By the rotation of the knob 13, the drag control screw 3 is rotated about its axis, so that the drag control screw 3 is displaced in its axial direction because of the threading engagement between the threads 2a and 3a.

In FIG. 4, a rear end portion 4a of a spool shaft 4 extends into a hollow space of the sleeve member 2. The other end portion of the spool shaft 4 is fixed to a spool (not shown). A plurality of drag washers 5 are mounted over the rear end portion 4a of the spool shaft 4. The drag washers 5 are positioned in an annular space defined between the spool shaft 4 and the cylindrical member 2. Frictional forces between the drag washers are controllable or changeable because of the axial displacement of the drag control screw 3.

For providing the drag washers 5, a plurality of washer members are aligned along axial direction of the spool shaft 4. The rear end portion 4a of the spool shaft 4 has an elliptical cross-section, and a sleeve member 6 having elliptical cross-section at its inner peripheral surface is fitted over the rear end portion 4a. The outer peripheral surface of the sleeve member 6 also has an elliptical cross-section.

Among the plurality of drag washer members 5, three drag washers 5a have elliptical central bores, so that the washers 5a are rotatable together with the rotation of the spool shaft and is slidable with respect to the shaft in the axial direction thereof. Other three washers 5b have outer peripheral portions engageable with the grooves 2a of the cylindrical member 2, so that rotation of the three washers 5b relative to the spool shaft 4 is prevented, while the washers 5b are slidable on the shaft undergoing guidance by the grooves 2b. Further, each of the remaining washers 5c interposed between the washers 5a and 5b is rotatable about the shaft 4 and slidable with respect thereto. A fixed washer 7 is provided at distal end of the group of the washer members 5. The washer 7 is disposed within the cylindrical member 2.

The drag control screw 3 has an urging surface 3c. Between the urging surface 3c and other distal end of the group of the washer members 5, a drag spring 8 and a pressure member 9 are provided. The pressure member 9 is disposed coaxial with the sleeve member 3b and is slidable with respect thereto.

Upon rotation of the drag knob 13, the drag control screw 3 is rotated, so that the urging surface 3c urges the drag spring 8 and the pressure member 9 toward the drag washers 5. The washer members slide along the spool shaft 4 toward the spool, so that the drag members 5b and 5c press the drag members 5a integrally rotatable with the spool shaft 4. As a result, the spool shaft 4 is subjected to braking force through the sleeve member 6. As a result, the spool is subjected to drag control.

According to the present invention, the drag control screw 3 has a small outer diameter portion at its axially intermediate portion. The small diameter portion provides a stepped portion 10 which provides a side wall face 10a at axially inner side positioned closer to the spool. The side wall face 10 is directed perpendicular to the axial direction of the drag control screw 3.

As shown in FIGS. 4 and 7, the outer peripheral surface of the other end portion of the drag control screw 3 is formed with indentations 11 in which a plurality of recesses 11a extend in axial direction thereof. Further, a polygonal recessed portion 12 is formed at the end face of the other end portion of the screw 3. The polygonal recessed portion 12 is in the form of hexagon as shown in FIG. 7.

The drag control knob 13 is disposed coaxial with the drag control screw 3. The knob 13 has a cup shape configuration including a circular portion 13b, an outer cylindrical portion 13c disposed over the cylindrical member 2, and a hollow polygonal portion 13a extending from the circular portion 13b toward the other end face of the screw 3. The hollow polygonal portion 13a is fitted with the polygonal recessed portion 12 of the screw 3, and is fixed thereto by means of a screw member 14. Therefore, the drag control screw 3 is rotated integrally with the rotation of the drag control knob 13.

The outer cylindrical portion 13c is spaced away from the outer peripheral surface of the cylindrical member 2, so that an annular space is provided therebetwen. Further, the outer cylindrical portion 13c has a suitable length to cover the cylindrical member 2 and the drag control screw 3.

Figure 5A:
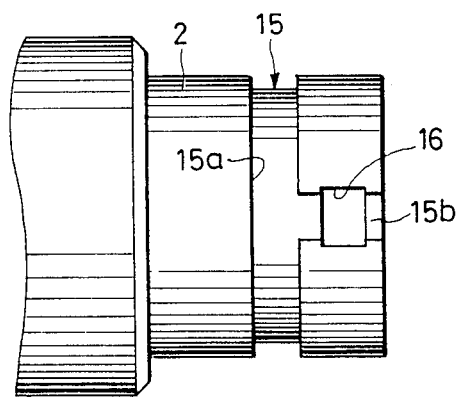
FIG. 5($a$) is a plan view of a sleeve portion in the drag control device according to this invention.
Figure 5B:
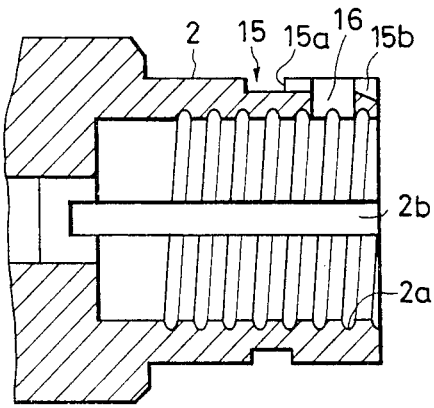

According to the embodiment, the cylindrical member 2 has the outer peripheral portion at which a fitting groove 15 and a through hole 16 are formed. More specifically, the fitting groove 15 includes an annular groove 15a and a linear groove 15b extending from the groove 15a in axial direction of the cylindrical member 2 as best shown in FIG. 5(a). Therefore, when viewing the cylindrical member 2, the fitting groove 15 has T-shape (see FIG. 5(a)). On the other hand, the through hole 16 is positioned at generally half way of the linear groove 15b, and is directed perpendicular thereto.

As shown in FIGS. 4 and 6 thru 8(b), a click spring member 17 is fitted with the fitting groove 15. The click spring member 17 is formed of resilient plate member and has a configuration shown in FIGS. 8(a) and 8(b). More specifically, the click spring member 17 includes a generally annular fixing portion 17a, an arm portion 17b and at least one projecting portion 17d which serves as a stop member. The fixing portion 17a has an open lip portion 17a' and is radially outwardly expandable for snap-fitting with the annular groove 15a because of its resiliency. The arm portion 17b extends from the annular fixing portion 17a in axial direction thereof, and has a free end provided with an engaging piece 17c. The arm portion 17b is engageable with the linear groove 15b, and the engaging piece 17c has semi-circular shape and protrudes radially inwardly with respect to the annular portion 17a. The engaging piece 17c is selectively engageable with one of the recesses 11a of the indentations 11(see FIG. 7). The two projecting portions (plate members) 17d extend from axially center portion of the arm portion 17b and protrude radially inwardly as shown in FIGS. 6 and 8(b). Alternatively, the projecting portion is formed integral with the annular fixing portion 17a and extends radially inwardly (not shown). The projecting portions 17d pass the through hole 16 and extend into the step portion 10. Each of the plate members has a distal end face positioned closer to the reel body, and the distal end face is abuttable against one stepped portion side positioned closer to the reel body. The stepped portion 10 has sufficient axial length so as to allow axial displacement of the drag control screw 3, yet preventing the screw 3 from its excessive displacement.

By enlarging the diameter of the annular portion 17a against biasing force thereof, the portion 17a is mounted on the annular groove 15a, and the annular portion 17a is snap-fitted with the groove 15a by restoring its original shape. In this state, the arm portion 17b is fitted with the linear groove 15b and its free end exceeds the distal end of the cylindrical member 2, so that the enegaging piece 17c is in contact with the indentation 11. Further, since the projecting portions 17d are engaged with the through hole 16, eliminated is the displacement of the click spring member in its axial and circumferential directions with respect to the cylindrical member 2. Incidentally, the arm portion 17b of the click spring 17 extends in horizontal direction as shown in FIG. 4. However, the arm portion 17b can be bent toward central axis as shown in FIG. 8(a), so that outer diameter of the end portion of the drag control screw 3 can become small, to thereby provide a compact device.

In operation, upon rotation of the drag control knob 13, the drag control screw 3 is also rotated about its axis, and the screw 3 is displaced in its axial direction G or the direction opposite the G direction. This screw movement is transmitted to the drag washers 5 through the drag spring 8 and the pressure member 9, so that drag control is attainable.

In this case, upon rotation of the drag control screw 3, the engaging portion 17c of the click spring member 17 resiliently rides over the intendations 11 to produce an audible clicking sound. Therefore, easy and stabilized drag control is attainable. Further, since the projecting portions 17d pass through the through hole 16 and extend into the stepped portion 10, the side surface wall 10a of the stepped portion 10 is in abutment with the projecting portions 17d. Therefore, if the screw 3 is displaced toward its releasing direction (direction H in FIG. 4), this movement is terminated upon the side wall 10a being in abutment with the projecting portions 17d. Therefore, droping or disassembly of the drag control screw 3 from the reel body is obviated in the present invention.

In view of the foregoing, according to the present invention, the clicking action between the engaging piece 17c and the indentations 11 provides audible clicking sound, and therefore, the optimum drag condition can be acknowledged by the operator. Further, the clicking engagement can also prevent the drag knob from its free rotation or relaxation. Furthermore, Separation or release of the drag control screw and drag knob from the reel body is avoidable because of the engagement between the drag control screw and the click spring member fixed to the cylindrical member. Such advantageous effects are obtainable by the formation of indentations at the drag control screw and mere addition of of the click spring member. Therefore, resultant device provides simple construction with minimized number of mechanical parts or segments. Moreover, the click spring member is easily assembled to and disassembled from the cylincrical member and is easily engageable with the through hole and indentations without any employment of jigs or tools.

While the invention has been described in detail and with reference to specific embodiment thereof, it will be apparent for those skilled in the art that various changes and modifications can be made therein without departing from the spirit and scope of the invention.

What is claimed is:

1. A drag control device in a spinning type fishing reel which includes a reel body and a spool shaft extending through said reel body, said device comprising:
   a hollow cylindrical member extending from a rear portion of said reel body and disposed over said spool shaft, said hollow cylindrical member being formed with a groove at its outer peripheral surface and with a through-hole extending in a radial direction thereof;
   a drag control screw having one end portion, an intermediate portion and another end portion, said one end portion being threadingly engaged with said hollow cylindrical member, said intermediate portion being formed with a stepped portion, and said another end portion being formed with indentations at an outer peripheral surface thereof,
   a click spring member fitted with said groove and engageable with said indentations, and a stop member cooperating with said click spring member and extending through said through-hole into said stepped portion, wherein said groove includes an annular groove and a linear groove extending from said annular groove, and wherein said click spring member comprises an annular portion snap-fitted with said annular groove, an arm portion extending from said annular portion and fitted with said linear groove, an engaging portion provided at a free end of said arm portion and selectively engageable with one of a plurality of recesses defined by said indentations, and a projecting portion extending in a radially inward direction of said annular portion, said projecting portion serving as said stop member.

2. The drag control device as defined in claim 1, wherein said stepped portion is positioned adjacent said through-hole, and has an axial length allowing axial displacement of said drag control screw upon rotation thereof.

3. The drag control device as defined in claim 1, wherein said through-hole is positioned at said linear groove.

4. The drag control device as defined in claim 1, wherein said annular portion has an open lip portion to allow its radial expansion.

5. The drag control device as defined in claim 1, wherein said arm portion extends in a direction parallel with an axial direction of said drag control screw.

6. The drag control device as defined in claim 1, wherein said arm portion is bent toward a central axis of said drag control screw.

7. The drag control device as defined in claim 1, wherein said engaging portion protrudes radially inwardly and has a semi-circular shape.

8. The drag control device as defined in claim 1, wherein said projecting portion comprises at least one plate member having a distal end face positioned closer to said reel body, said distal end face being abuttable against one side of the stepped portion positioned closer to said reel body.

9. The drag control device as defined in claim 1, further comprising a drag control knob disposed over said drag control screw and fixedly secured to said other end portion thereof.

* * * * *